Patented Dec. 4, 1951

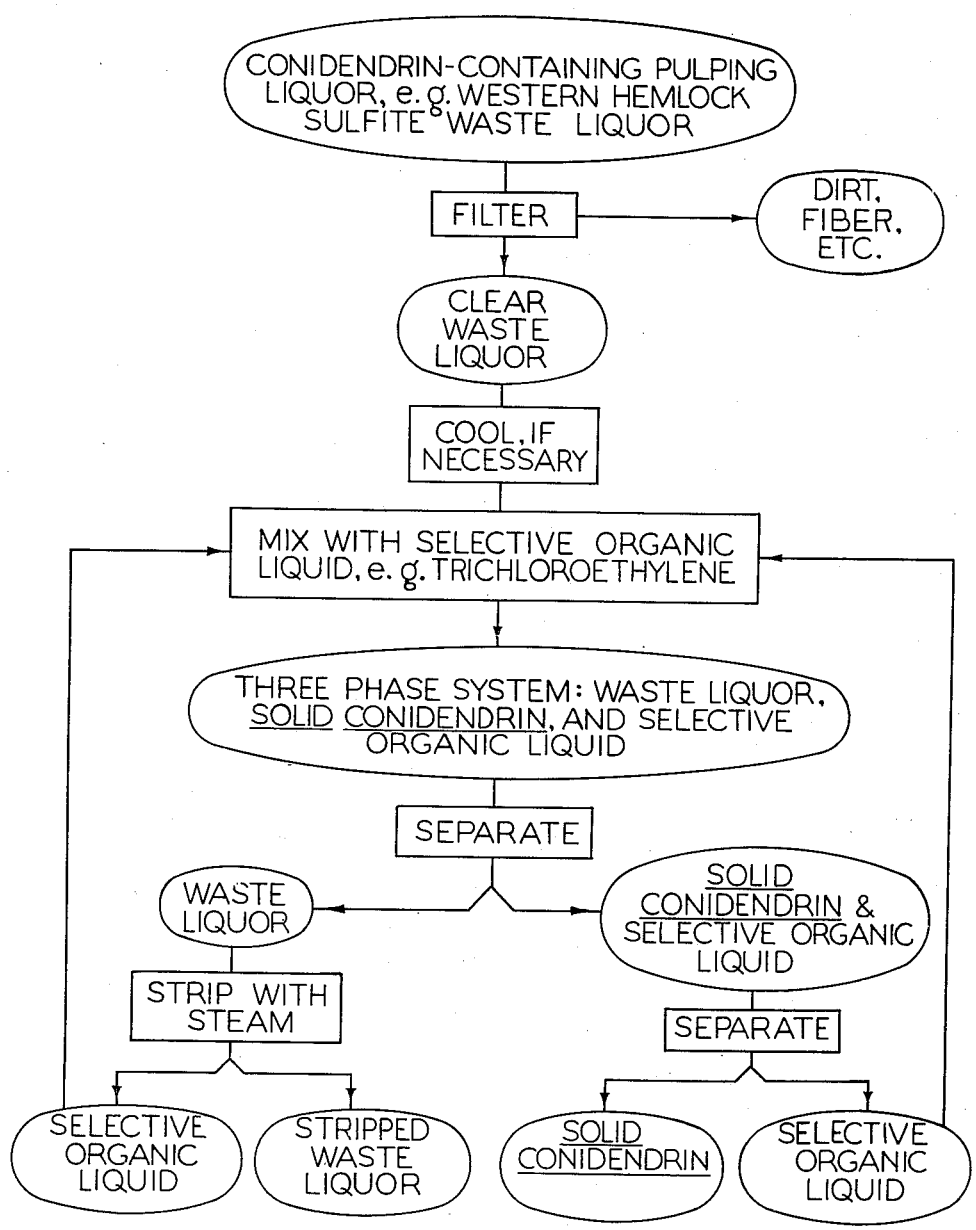

2,577,470

UNITED STATES PATENT OFFICE 2,577,470

PROCESS FOR THE SEPARATION OF CONI-
DENDRIN FROM LIQUORS CONTAINING
THE SAME

Homer B. Lackey, Camas, Wash., assignor to
Crown Zellerbach Corporation, Camas, Wash.,
a corporation of Nevada Application April 18, 1949, Serial No. 88,186

14 Claims. (Cl. 260—344.6)

The present invention relates to a process for the separation of conidendrin from liquors in which it is contained, particularly from waste liquors resulting from the sulfite pulping of cellulosic materials.

Conidendrin is an organic chemical compound found naturally in the wood of trees of many species, including the spruces, firs, and hemlocks, particularly western hemlock. It is a high melting material, having the following formula:

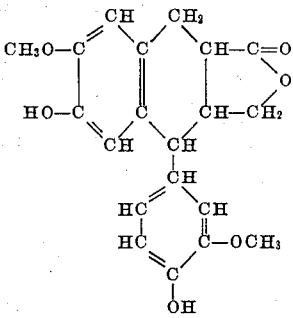

Conidendrin

Although the utility of conidendrin has not as yet been fully explored due, principally, to its inavailability in substantial quantities, it already is recognized as a potentially valuable raw material for use in the synthesis of chemicals useful in the dye industry, and in the production of pharmaceuticals. Its value also has been established as a raw material for the production of anti-oxidants for fats and oils. Since it is characterized by the presence of several reactive functional groups, its suitability for use in the production of a wide range of organic chemicals is indicated.

During the treatment of conidendrin-containing wood with certain pulping agents, the conidendrin is separated from the cellulose and, together with the lignin content of the wood, passes into the waste liquor. Although the proportion of conidendrin contained in such liquors is very small, being only about 0.5 to 1.4 grams per liter of sulfite waste liquor derived from the pulping of western hemlock, this represents in aggregate a substantial amount. A single paper mill, for example, may produce as much as 350 tons of western hemlock sulfite pulp per day, 2,000 gallons of waste liquor being produced for each ton of pulp. A typical liquor produced by such a mill in a single day thus may contain about 6,000 pounds of conidendrin and represents a significant source of this material.

Various attempts have been made to isolate conidendrin from the waste liquors in which it is contained. These uniformly have consisted of extracting the waste liquor with a solvent, the solvent being mixed in substantial amount with the waste liquor until the conidendrin has been dissolved and extracted. Such processes have been unattractive commercially, however, because of (1) the low solubility of conidendrin in substantially all of the usual commercial solvents, (2) the large volume of solvent required, (3) the long extracting periods and complicated extraction equipment necessary, (4) the hazard attendant upon working with large volumes of the common solvents, and (5) the impurity of the conidendrin produced.

While recovering the conidendrin from sulfite waste liquor by extraction in the foregoing conventional manner using trichloroethylene as a solvent, I made the unexpected observation that, when a small amount of trichloroethylene was agitated with the sulfite waste liquor, and the resulting mixture allowed to stand briefly to permit phase separation to take place, the result was not primarily the separation of the mixture into a lower layer comprising trichloroethylene and dissolved conidendrin, and an upper layer comprising the sulfite waste liquor. Instead, there were three layers present. The top layer comprised the aqueous sulfite waste liquor. The bottom layer comprised the trichloroethylene in which was dissolved a small proportion of the conidendrin and other extractives. At the interface between these layers, there was an intermediate layer comprising solid conidendrin in a substantially pure state. Furthermore, when the amount of organic liquid used in the extraction was controlled, the major proportion of the conidendrin could be isolated in this manner. It then could be separated readily from the liquid content of the mixture by any suitable procedure for separating a solid from a solid-liquid mixture.

Hence, as is illustrated in the single figure of the drawings, my process for separating conidendrin from liquors containing the same broadly comprises forming a mixture of the liquor with a selective organic liquid characterized by substantial insolubility in the liquor and by the ability to separate the conidendrin therefrom as a solid deposit, and separating the solid conidendrin from the mixture of liquor and selective organic liquid.

Stated more specifically, my process for separating conidendrin from sulfite waste liquor or other liquors in which it is contained comprises filtering the crude waste liquor to remove fibers, dirt, etc., cooling if necessary, and thoroughly mixing the cool liquor with a selective organic liquid such as trichloroethylene, used in amount sufficient to saturate the sulfite waste liquor and preferably to form two liquid phases, but insufficient to dissolve the conidendrin. The mixture then is thoroughly agitated and allowed to settle. This results in the formation of a three-phase system, having a deposit of solid conidendrin present principally at the interface between two liquid phases. That fraction containing the conidendrin is separated from the residual liquor and filtered or otherwise processed to separate the conidendrin as a substantially pure, solid product. The selective organic liquid then may be recycled for the treatment of further quantities of conidendrin-containing liquor, while the residual liquor may be stripped with steam or otherwise treated for the recovery of a further quantity of selective organic liquid.

A variety of liquors may be treated by the process of the present invention for separation of their conidendrin content. Suitable ones comprise broadly the liquors having a pH of below about 9.5 resulting from the pulping of conidendrin-containing woods with such reagents as calcium bisulfite, magnesium bisulfite, ammonium bisulfite, sodium bisulfite, sodium sulfite, or with sulfur dioxide alone. In all of these processes, water soluble lignin sulfonic acids are formed which lend themselves to treatment with a selective organic liquid by the presently disclosed process. Particularly well suited to the practice of the invention are the calcium base and magnesium base sulfite waste liquors resulting from the pulping of western hemlock.

To be suitable for use in the separation of conidendrin from waste liquors of the above types, an organic liquid should possess the following characteristics:

1. It should be substantially insoluble in the conidendrin-containing liquor to make possible the formation of a liquor phase and an organic liquid phase after the mixture of the two materials.
2. It should have limited solvent power for conidendrin to make possible the separation of the latter as a solid. This requirement is met by most organic liquids, since conidendrin is a material of low solubility in solvents of substantially all classes.
3. It should have the ability to extract the conidendrin selectively from the other materials comprising the waste liquor and to deposit it in solid form at the interface between the liquor phase and the organic liquid phase.
4. It should be nonreactive chemically toward conidendrin.

A large number and variety of organic liquids fulfill the above requirements and hence are suitable for the purposes of the present invention. These include certain of the hydrocarbons, the halogenated hydrocarbons, the ethers, the esters, the carbonyl compounds, the fatty acids, and the nitro compounds.

In the hydrocarbon series, the paraffin hydrocarbons as a group do not appear to have the desired action in the isolation of conidendrin from waste liquors. However, certain of the cycloparaffins, e. g. dipentene, and the aromatic hydrocarbons generally are suitable for this application. Of the latter group, benzene, toluene, the xylenes, and diphenyl methane all are suitable.

The halogenated hydrocarbons as a class, including the chloro, bromo, and iodo compounds, are broadly effective for use in the presently described process. Representative ones which have been tried and found suitable are:

| | |
|---|---|
| Methylene chloride | Chloropropane |
| Chloroform | 1,5 dichloropentane |
| Carbon tetrachloride | Chlorobenzene |
| Ethylene chloride | Bromobezene |
| Trichloroethylene | n-Propyl bromide |
| Perchloroethylene | Methyl iodide |

Similarly, the ethers as a group appear applicable. This includes both the aliphatic and the aromatic ethers. Representative members of this class are:

| | |
|---|---|
| Ethyl ether | n-Amyl ether |
| B,B'dichloroethyl ether | Iso-amyl ether |
| n-Propyl ether | Eugenol |
| Isopropyl ether | Guaiacol |
| n-Butyl ether | |

The broad class of water insoluble, liquid carbonyl compounds also may be used, including the aldehydes and the ketones, both aliphatic and aromatic. Illustrative of suitable compounds of this class are the following:

| | |
|---|---|
| Methyl isobutyl ketone | Mesityl oxide |
| Diisobutyl ketone | Furfural |
| Butyraldehyde | Benzaldehyde |

Many of the liquid esters may be used. Examples are:

| | |
|---|---|
| Ethyl acetate | Ethyl succinate |
| Ethyl malonate | Ethyl benzoate |
| Ethyl acetoacetate | Isoamyl salicylate |
| Ethyl salicylate | n-Amyl propionate |

Similarly, some of the liquid fatty acids may be employed, representative ones being:

n-Caprylic acid          Oleic acid

These various selective organic liquids may be employed singly or in admixture with each other, or with other suitable organic liquids in the production of liquid systems which are effective in separating the conidendrin from the waste liquors in which it is contained. In many applications they may be used to advantage after being saturated with conidendrin. This is particularly true where cyclic operation is contemplated.

Of the foregoing liquids, the halogenated hydrocarbons, particularly trichloroethylene, are preferred because of their effective action and their lack of flammability. Certain of the others, however, particularly benzene, toluene, methyl isobutyl ketone, furfural, diisopropyl ether, and ethyl acetate are highly effective and are attractive for use from an economic standpoint.

The amount of selective organic liquid to be used obviously will vary with the identity of the liquid, the source and properties of the conidendrin-containing liquor, and the temperature and other operating conditions. In general, however, sufficient of the organic liquid should be employed to saturate the conidendrin-containing liquor, and preferably enough to establish a separate organic liquid phase. The upper limit of use of organic liquid is that sufficient to dissolve a substantial amount of the conidendrin so that it will not separate as a solid between the two layers. Generally, the required amount of organic liquid is very small, i. e. of the order of from about 0.5% to about 10% by volume of the waste liquor. Where trichloroethylene is used as the selective organic liquid, only from about 1% to about 3% by volume of this material is required.

The small amount of organic liquid which is necessary to accomplish the separation of the conidendrin in the solid state is in large measure responsible for the commercial promise attaching to the instant invention. It also, in all probability, is responsible for failure of prior investigators to observe and apply the phenomenon, since the prior art uniformly teaches the use of large volumes of solvent, often at elevated temperatures, the combined effect of these two factors being to dissolve completely the conidendrin and prevent its separation as a solid.

The process variables other than the relative amounts of waste liquor and selective organic liquid may be controlled as required to operate the process successfully. Thus, although the waste liquor as produced by the pulping procedure has a solids content suitable for practice of the invention, it may be diluted or concentrated if desired. Dilution of the waste liquor may be helpful in rendering it more amenable to handling in conventional processing equipment, and this may be done without decreasing the total amount of conidendrin recovered. It has the adverse effect, however, of requiring the use of a larger amount of selective organic liquid for unit weight of conidendrin obtained. Also, concentrated waste liquor may be used, although in this case the addition of the selective organic liquid may precipitate inorganic salts as well as conidendrin, thus producing a less pure product. Sulfite waste liquor from the sulfite pulping of western hemlock wood and having a solids content of about 11% by weight is well suited for use as a raw material in the practice of this invention.

The acidity of the waste liquor also may vary within a considerable range. The process is applicable broadly at pH's over the range of from about pH 1 to about pH 9.5, a range of between about pH 1 and about pH 4 being preferred. At pH levels of about 9.5 and above, the conidendrin is converted to a water soluble salt, which obviously would remain in solution in the aqueous phase and not be separated as a solid upon the addition of the selective organic liquid. Waste sulfite liquor as it comes from the digester and having a pH of about 2.7 may be employed advantageously without adjustment of its acidity.

The temperature at which the process of the invention is executed, like the relative proportions of the waste liquor and the selective organic liquid, is a function principally of the particular organic liquid used, and the source and nature of the conidendrin containing liquor. In general, the temperature should be maintained at a level above the freezing points of the liquids involved, but below that at which the quantity of selective organic liquid employed will dissolve substantial amounts of the conidendrin. With most organic liquids, a temperature range between the freezing point of the liquid (or of the sulfite waste liquor, whichever is the higher) and about 60° C. is suitable. Preferred temperatures lie within the range of between about 0° C. and about 30° C., these with most organic liquids giving a particularly complete and rapid separation of the conidendrin.

The manner of carrying out the process of the invention is simple, particularly as compared with the relatively complex extraction processes of the prior art. The conidendrin-containing liquor preferably first is filtered to remove any extraneous materials such as dirt or pulp fibers which might contaminate the conidendrin product. After adjusting its temperature to a value of between about 0° C. and about 60° C., preferably below 30° C., it is mixed with a predetermined amount of the chosen selective organic liquid. As explained above, this amount is variable with the particular organic liquid employed, but usually is about 2% by volume, based on the volume of the waste liquor. The mixture of liquor and organic liquid then is thoroughly mixed by stirring, shaking the containing vessel, pumping the organic liquid through the liquor, agitating the liquids by means of a current of air or other gas, or by other suitable means.

After the organic liquid has been dispersed thoroughly throughout the waste liquor, agitation is discontinued and the mixture is allowed to stand. Phase separation occurs within a time determined principally by the identity of the organic liquid used. Two layers are formed, a waste liquor layer, and an organic liquid layer, the latter obviously being either the top or the bottom layer depending upon the relative densities of the particular organic liquid used and of the waste liquor.

The conidendrin is present in the mixture in the form of solid particles concentrated in the organic liquid layer or at or adjacent the junction of the organic liquid and the waste liquor layers. It may be secured in a very pure state by simple filtration, preferably after having separated the organic liquid layer with its content of solid conidendrin from the waste liquor layer. In some cases, it may be desirable to cut the fraction at such a point as to include a portion of the waste liquor adjacent the organic liquid layer and containing a small amount of solid conidendrin.

Various other means of separating the solid conidendrin may be employed. Where phase separation has occurred, the phases may be separated by siphoning, decantation, or other conventional methods of separating systems of this type. Alternatively, the entire mixture, after thorough agitation, may be run through a basket type centrifuge of conventional construction, operation of which effects a clean and rapid separation of the solid conidendrin and of the two liquid phases. If desired, the centrifuge employed may be of the cream separator type in which case a direct separation of the conidendrin and the heavier liquid from the other constituents of the mixture is obtained. In either type of the centrifugal operation, the time-consuming settling step is eliminated.

Still another method of separation comprises stripping with steam the mixture of solid conidendrin and organic liquid. This separates the latter in a form especially well suited for recycling to the treatment of further quantites of sulfite waste liquor.

The scope of the invention and the method of its execution are further disclosed in the following illustrative examples:

EXAMPLE 1

The following example illustrates a preferred method of separating conidendrin from calcium base sulfite waste liquor by the presently disclosed process.

40 gallons (151.5 liters) of calcium base sulfite waste liquor at atmospheric temperature (about 25° C.) was placed in a large, round bottomed, corrosion-resistant kettle. To it was added 3 liters of trichloroethylene. This gave a mixture containing a little less than 2% trichloroethylene by volume.

The resulting mixture then was beaten with a high-speed stirrer until homogeneous. This required about 15 minutes, although the stirring was continued for a total of 30 minutes. After stirring, the mixture was permitted to stand for 16 hours at about 25° C. This resulted in the formation of three layers: a top layer comprising aqueous sulfite waste liquor, an intermediate layer consisting of solid conidendrin, and a bottom layer comprising trichloroethylene.

Most of the supernatant aqueous sulfite waste liquor layer was removed by siphoning, and the residual bottom fraction, consisting of trichloroethylene and the overlying mixture of conidendrin and a small amount of waste liquor, was filtered to separate the solid conidendrin. The yield of the latter was 194.5 grams, or 1.28 grams per liter of waste liquor.

As a control, a quantity of waste liquor from the same source was extracted continuously with one-fourth its volume of trichloroethylene at the boiling point for eight hours. This gave a yield of 1.4 grams conidendrin melting at 251-253° C. per liter of sulfite waste liquor.

EXAMPLE 2

This example illustrates the application of the process of the invention to the recovery of conidendrin from magnesium base sulfite waste liquor obtained from the pulping of western hemlock. The liquor had a pH of 3.8 and a solids content of 11.1%.

6 liters of the liquor was agitated for 30 minutes with 120 milliliters of trichloroethylene, after which the resulting mixture was allowed to stand at room temperature for 24 hours. The upper aqueous layer was siphoned off, and the lower layer filtered. The yield of solid conidendrin was 4.5 grams, or 0.75 gram per liter of waste liquor.

EXAMPLE 3

This example illustrates the application of the process of the invention to the extraction of conidendrin from ammonium base sulfite waste liquor.

4 liters of ammonium base sulfite waste liquor having a solids content of 10.2% and a pH of 1.9% was agitated with 80 milliliters of trichloroethylene at room temperature. The resulting mixture then was permitted to settle at room temperature, after which the lower layer was separated and filtered. This produced 2.8 grams of conidendrin, or 0.70 gram per liter of waste liquor.

EXAMPLE 4

This example illustrates an alternate process for carrying out the process of the invention wherein the conidendrin is separated by centrifuging.

800 milliliters of calcium base sulfite waste liquor was mixed with 16 milliliters of trichloroethylene, the resulting mixture being stirred for 30 minutes with a high speed stirrer. The mixture then was placed in centrifuge, and spun for from 3 to 5 minutes at approximately 1,500 revolutions per minute. The aqueous supernatant liquid was poured off and the conidendrin removed from the remaining trichloroethylene by filtration. The yield was 0.46 gram of conidendrin, or 0.58 gram of conidendrin per liter of sulfite waste liquor.

EXAMPLE 5

This example illustrates the application of the process of the invention using varying proportions of selective organic liquid relative to the conidendrin-containing liquor.

One-liter portions of calcium base sulfite waste liquor were shaken with various amounts of trichloroethylene, and conidendrin separated from the resulting mixture using the procedure of Example 1. The yields of conidendrin obtained were as follows:

Table I

| Volume (ml.) trichloroethylene used per liter of waste liquor | Conidendrin recovered (grams/liter) |
|---|---|
| 1 | 0.09 |
| 8 | 0.43 |
| 10 | 0.43 |
| 15 | 1.09 |
| 18 | 1.17 |
| 21 | 0.88 |
| 25 | 0.69 |

EXAMPLE 6

This example illustrates the large scale operation of the process of the invention.

A large, closed vessel was partially filled with 4,170 gallons of sulfite waste liquor from a standard commercial pulping of western hemlock wood. The liquor had a pH of about 2.7 and a solids content of approximately 11%. To the liquor was added 76 gallons, or 1.79% by volume of trichloroethylene. The mixture was agitated by forcing air through it from the bottom at a room temperature of approximately 25° C. After the two materials were thoroughly mixed, they were allowed to stand until separation of the phases had occurred. The lower layer then was removed from the bottom of the vessel and passed through a basket centrifuge. The conidendrin obtained in this manner weighed 16.9 pounds.

EXAMPLE 7

The following example illustrates the application of the process of the invention using a liquid hydrocarbon as a means of separating the conidendrin.

1 liter of sulfite waste liquor was placed in a container and agitated vigorously at room temperature with 25 milliliters toluene. The resulting mixture was allowed to stand at room temperature for four hours. The lower layer comprising the waste liquor then was run from the bottom of the container, leaving a small residual portion containing solid conidendrin together with the upper toluene layer, which contained the major proportion of the conidendrin. The conidendrin-containing fractions then were filtered to separate the solid conidendrin. The yield of conidendrin was 0.64 gram.

As a control, sulfite waste liquor from the same source was extracted with toluene at the boiling point. Evaporation of the solvent yielded a small amount of gummy, tarry, dark colored material from which solid conidendrin could not be obtained by any of the usual procedures.

EXAMPLE 8

This example illustrates the application of the process of the invention using an aliphatic ketone as a selective organic liquid.

Two liters of sulfite waste liquor was mixed with 40 milliliters of methyl isobutyl ketone. The mixture then was agitated vigorously with a high speed stirrer at room temperature for 30 minutes. It was then allowed to stand for five hours. The resulting two phases were separated, the lower waste liquor layer being substantially completely withdrawn from the upper organic solvent and the intermediate conidendrin layer. The conidendrin-containing fraction then was filtered, giving a conidendrin yield of 0.6 gram per liter of waste liquor.

The following examples illustrate the application of the process of the invention to the extraction of conidendrin from waste liquors using a variety of selective organic liquids. In all cases, the waste liquor employed was calcium base sulfite waste liquor resulting from the standard cooking of western hemlock wood, and having a pH of about 2.7 and a solids content of about 11.2%. In most cases the amount of the selective organic liquid employed was from 1 to 3% by volume. In all cases, the organic liquid was mixed with the sulfite waste liquor until the two liquids were thoroughly intermixed. The resulting mixture then was allowed to stand until phase separation had occurred, after which the aqueous phase was separated substantially completely from the conidendrin-containing organic liquid phase. The latter then was filtered to remove the solid conidendrin. All of the operations were carried out at a normal room temperature of about 25° C. The results are summarized in Table II.

Table II

| Example Number | Selective Organic Liquid | Solid Conidendrin Separated |
|---|---|---|
| | *Hydrocarbons* | |
| | Aliphatic: | |
| 9 | Petroleum Ether (hexanes) | No. |
| 10 | Higher Hydrocarbons (Nujol) | No. |
| | Cycloaliphatic: | |
| 11 | Cyclohexane | No. |
| 12 | Dipentene | Yes. |
| | Aromatic: | |
| 13 | Benzene | Yes. |
| 14 | Xylenes | Yes. |
| 15 | Diphenyl | Yes. |
| 16 | Diphenyl methane | Yes. |
| | *Halogenated Hydrocarbons* | |
| 17 | Methylene chloride | Yes. |
| 18 | Chloroform | Yes. |
| 19 | Carbon tetrachloride | Yes. |
| 20 | Ethylene Chloride | Yes. |
| 21 | Perchloroethylene | Yes. |
| 22 | Chloropropane | Yes. |
| 23 | 1,5 dichloropentane | Yes. |
| 24 | Chlorobenzene | Yes. |
| 25 | Bromobenzene | Yes. |
| 26 | n-Propyl bromide | Yes. |
| 27 | Methyl iodide | Yes. |
| | *Ethers* | |
| 28 | Ethyl Ether | Yes. |
| 29 | B, B'Dichloroethyl Ether | Yes. |
| 30 | n-Propyl Ether | Yes. |
| 31 | Isopropyl Ether | Yes. |
| 32 | n-Butyl Ether | Yes. |
| 33 | n-Amyl Ether | Yes. |
| 34 | Iso-amyl Ether | Yes. |
| 35 | Eugenol | Yes. |
| 36 | Guaiacol | Yes. |
| | *Nitro Compounds* | |
| 37 | Nitromethane | Yes. |
| 38 | Nitroethane | Yes. |
| 39 | 2-nitropropane | Yes. |
| 40 | Nitrobenzene | Yes. |
| | *Carbonyl Compounds* | |
| | Aldehydes: | |
| 41 | Butyraldehyde | Yes. |
| 42 | Furfural | Yes. |
| 43 | Benzaldehyde | Yes. |
| | Ketones: | |
| 44 | Diisobutyl Ketone | Yes. |
| 45 | Mesityl oxide | Yes. |

Table II—Continued

| Example Number | Selective Organic Liquid | Solid Conidendrin Separated |
|---|---|---|
| | *Esters* | |
| 46 | Ethyl acetate | Yes. |
| 47 | Ethyl malonate | Yes. |
| 48 | Ethyl acetoacetate | Yes. |
| 49 | Ethyl salicylate | Yes. |
| 50 | Ethyl succinate | Yes. |
| 51 | Ethyl benzoate | Yes. |
| 52 | Isoamyl salicylate | Yes. |
| 53 | n-Amyl propionate | Yes. |
| | *Fatty Acids* | |
| 54 | n-Caprylic acid | Yes. |
| 55 | Oleic acid | Yes. |
| | *Amines* | |
| 56 | Piperidine | No. |
| 57 | Triethyltetramine | No. |
| | *Alcohols* | |
| 58 | Isoamyl alcohol | No. |
| 59 | Tetrahydrofurfuryl alcohol | No. |
| 60 | Lauryl alcohol | No. |
| 61 | Butanol | No. |
| | *Phenols* | |
| 62 | Cresol | No. |
| 63 | O-sec. amyl phenol | No. |
| 64 | Di sec. amyl phenol | No. |
| | *Miscellaneous* | |
| 65 | Carbon disulfide | No. |
| 66 | Lauryl mercaptan | No. |

As is readily apparent from an inspection of Table II, the process of the present invention is widely applicable using a number of different classes of selective organic liquids. However, under the conditions employed, it appears to be highly specific for given liquids. Thus, although certain classes of liquids such as the halogenated hydrocarbons appear to be applicable broadly as a class, only certain members of other classes of liquids appear applicable. In the hydrocarbon series, for example, the aromatic hydrocarbons appear broadly applicable, while the low molecular weight aliphatic hydrocarbons do not. In the cycloaliphatic series, cyclohexane does not appear suitable, while dipentene is effective for the purpose.

However, by employing a chosen selective organic liquid suitable for use with the particular waste liquor and operating equipment contemplated, the process of the present invention affords a highly effective means for separating conidendrin rapidly and economically from the liquors in which it is contained. As compared with the solvent extraction process of the prior art, application of the present process is attended by many significant advantages. The equipment and operating procedure are relatively simple. The process may be used with sulfite waste liquors as they are obtained from normal pulping procedures without a complicated and expensive preliminary treatment. Only a relatively small amount of selective organic liquid is required, and this may be recycled with or without a preliminary purification for the separation of further quantities of conidendrin. The process may be carried out at room temperature or below so that heating equipment is not required and the hazard attendant upon the use of inflammable liquids at high temperatures is avoided. The conidendrin product is isolated in a substantially pure state, probably because the waste liquor is not subjected to long, continuous extraction with hot solvent which removes a large amount of the extraneous coloring materials in the liquor together with the conidendrin.

Furthermore, as is seen from Example 7, the presently described process enables use of toluene and other organic liquids of commercial importance which are not effective in the separation of conidendrin from waste liquors by the conventional process of extracting the liquor with hot solvent. Hence there is provided for the first time a practical, economical method for the recovery by the treatment on a large scale of commercial waste pulping liquors of a valuable organic chemical known heretofore only as a laboratory specialty chemical.

Having now described my invention in preferred embodiments, I claim as new and desire to protect by Letters Patent:

1. The process of separating conidendrin from conidendrin-containing liquors having a pH not substantially higher than pH 9.5, which comprises forming a mixture of the liquor with a selective organic liquid characterized by substantial insolubility in the conidendrin-containing liquor and by the ability to separate the conidendrin in the solid state, the selective organic liquid being used in amount sufficient to precipitate the conidendrin from the liquor but insufficient to dissolve a substantial amount of the conidendrin, and separating the solid conidendrin from the resulting mixture of liquor, conidendrin, and selective organic liquid.

2. The process of obtaining conidendrin from liquors having a pH of less than about 9.5, which comprises mixing the liquor with a selective organic liquid comprising a halogenated hydrocarbon, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

3. The process of obtaining conidendrin from liquors having a pH of less than about 9.5, which comprises mixing the liquor with a selective organic liquid comprising trichloroethylene, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

4. The process of obtaining conidendrin from liquors having a pH of less than about 9.5, which comprises mixing the liquor with a selective organic liquid comprising carbon tetrachloride, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

5. The process of obtaining conidendrin from liquors having a pH of less than about 9.5, which comprises mixing the liquor with a selective organic liquid comprising an aromatic hydrocarbon, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

6. The process of obtaining conidendrin from liquors having a pH of less than about 9.5, which comprises mixing the liquor with a selective organic liquid comprising toluene, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

7. The process of obtaining conidendrin from liquors having a pH of less than about 9.5, which comprises mixing the liquor with a selective organic liquid comprising benzene, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

8. The process of obtaining conidendrin from liquors having a pH of less than about 9.5, which comprises mixing the liquor with a selective organic liquid comprising a substantially water insoluble organic carbonyl compound, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

9. The process of obtaining conidendrin from liquors having a pH of less than about 9.5, which comprises mixing the liquor with a selective organic liquid comprising a substantially water insoluble ketone, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

10. The process of obtaining conidendrin from liquors having a pH of less than about 9.5, which comprises mixing the liquor with a selective organic liquid comprising methyl isobutyl ketone, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

11. The process of obtaining conidendrin from liquors having a pH of less than about 9.5, which comprises mixing the liquor with a selective organic liquid comprising a substantially water insoluble aldehyde, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

12. The process of obtaining conidendrin from liquors having a pH of less than about 9.5, which comprises mixing the liquor with a selective organic liquid comprising a liquid ether, thereby precipitating the conidendrin in the solid state, the selective organic liquid being used in amount sufficient to precipitate the solid conidendrin but insufficient to dissolve the same at the mixing temperature employed, and separating the solid conidendrin from the resulting mixture of liquor, conidendrin and selective organic liquid.

13. The process of obtaining conidendrin from the waste liquors obtained by the sulfite pulping of cellulosic material, which comprises mixing the liquor at a pH not substantially higher than about pH 9.5 with a selective organic liquid characterized by substantial insolubility in the conidendrin-containing liquor and by the ability to separate the conidendrin in the solid state, the selective organic liquid being used in amount sufficient to precipitate the conidendrin from the liquor but insufficient to dissolve a substantial portion of the conidendrin, and separating the solid conidendrin from the resulting mixture.

14. The process of separating conidendrin from conidendrin-containing liquors having a pH not substantially higher than about pH 9.5, which comprises admixing the liquor with a selective organic liquid characterized by substantial insolubility in conidendrin-containing liquors and by the ability to separate the conidendrin in the solid state, the selective organic liquid being used in amount sufficient to precipitate the conidendrin from the liquor but insufficient to dissolve a substantial portion of the conidendrin, thereby forming a liquor phase and an organic liquid phase with a solid deposit of conidendrin therebetween, separating the organic liquid phase and the solid conidendrin from the liquor phase, and separating the solid conidendrin from the organic liquid phase.

HOMER B. LACKEY.

REFERENCES CITED

The following references are of record in the file of this patent:

Pearl: J. Org. Chem., vol. 10, 219-221 (1945).
Holmberg: Ber. 54, 2389-2391 (1921).